July 9, 1957      H. H. BLY      2,798,896

FLEXIBLE BATTERY

Filed March 19, 1954      2 Sheets-Sheet 1

INVENTOR.
HERMANN H. BLY
BY Joe Weber
ATTORNEY

July 9, 1957 H. H. BLY 2,798,896
FLEXIBLE BATTERY
Filed March 19, 1954 2 Sheets-Sheet 2

INVENTOR,
HERMANN H. BLY
BY
Joe Weber.
ATTORNEY

United States Patent Office 2,798,896
Patented July 9, 1957

2,798,896

FLEXIBLE BATTERY

Hermann H. Bly, Wanamassa, N. J., assignor to the United States of America as represented by the Secretary of the Army Application March 19, 1954, Serial No. 417,528

1 Claim. (Cl. 136—181)

(Granted under Title 35, U. S. Code (1952), sec. 266)

The invention described herein may be manufactured and used by or for the Government for governmental purposes, without the payment of any royalty thereon.

The present invention relates to a flexible battery assembly. More particularly, the invention relates to a lightweight, flexible assembly comprising a single panel or a plurality of panels incorporating any desired number of primary cells spaced and insulated from each other while electrically connected to each other to make up a battery which can be utilized for furnishing current to an electrical device.

An object of the invention is to provide a flexible battery panel that can be readily secured to a harness-like garment, such as a vest.

An important feature of the invention is that the panel battery is flexible and lightweight so as not to inconvenience the movements of the wearer.

Another feature of the invention is that by the utilization of particular materials used to make up the flexible panel, the battery cells in the panel can be made completely waterproof but nevertheless allow unwanted hazardous battery gases to escape, eliminating the need of any mechanical vents.

Another feature of the invention is that by the utilization of the panel array battery herein described, it is possible to remove the conventional batteries from the instrument in which said batteries are contained and in lieu thereof the panel battery of this invention can be worn by the person using the instrument.

Another feature of the invention is that the panel batteries herein described can be easily and inexpensively fabricated by machine.

These and other objects and features will become more apparent as the description of the invention proceeds, to be read in view of the accompanying drawings in which.

In the description of the invention that follows, the battery assembly will be described for a particular use, that is, secured to a vestlike garment and beneath an outer garment, such as a parka, used in areas where the temperature reaches lows of −65° F. At such low temperatures it has been found that the life span of a small dry cell or primary batteries is exceedingly short, i. e., about two hours. If, however, the same battery cells can be kept warm their life span can be multiplied about ten times. In the light of such situation, it is possible by using the panel battery of this invention in a garment worn beneath an outer coat to lengthen the life span of such batteries. It has also been found that it is possible to mount a greater number of dry cells on such panel than could be incorporated into a device such as a portable radio transmitter and receiver, thereby diminishing the need of repeated changes of batteries in such a device.

Figure 1:
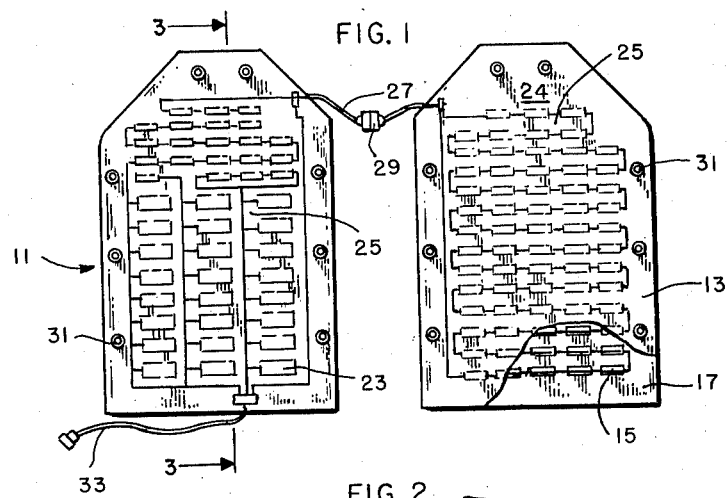
Figure 1 is a plan view of two battery panels embodying the present invention.

Referring to the drawing, and particularly the modification of Figure 1, there is shown a flexible battery comprising two panels generally designated as 11. For convenience of description only one of the two panels will be described. The battery panel 11 comprises a sheet 13 of pliable material such as rubber or plastic and includes a plurality of dry cells 15 disposed on a surface of the sheet 13. The cells 15 are affixed to the sheet in the following manner: A number of cells are aligned between two sheets 17 and 19 of a pliable plastic-like or rubber material which is heat-sealed at both its ends and between the separate cells, thereby forming an elongated strip as shown at 24. The manner of sealing and separating the batteries from each other is so accomplished that separate and individual battery cell containers 23 are formed with a grooved or channel portion 25 between adjacent containers 23. Several such strips of aligned cells are placed adjacent to each other, on the sheet 13, in substantially parallel arrangement, and all such strips are secured to sheet 13, as by heat-sealing. It is apparent that the battery panel described will be flexible along its length or width by reason of the flexibility of the spacing between the horizontal and vertical layers of cells. The material from which the battery panel 11, particularly the cell containers 23, is made, is of prime importance. A first requirement is that the material be such that it is waterproof so that the cells will not be damaged, and a the same time be of such porosity as to permit the undesirable gases to escape from the battery cells to the atmosphere. One material particularly adapted for such battery panels is polyethylene of 4 mil thickness. It is to be understood, of course, that prior to the sealing step the cell terminals may be connected to each other in any desired arrangement. Each panel 11 is provided with a cable 27 and a connector 29 for electrically connecting the individual panels. Each of the panels 11 is further provided with a plurality of snap-on fasteners 31 disposed about the edge of the panel substantially as shown. The snap-on fasteners 31 extend through the panels 11 thereby permitting stacked layers of panels to be assembled as desired. Extending from the panel is an output cable 33 provided for connecting the battery panel to a walkie-talkie 35 or any other device.

Figure 2:
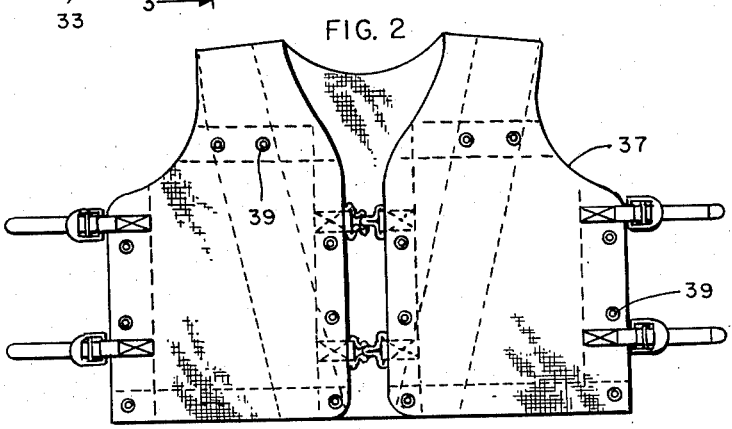
Figure 2 is a plan view of one form of harness to which the panels can be attached.
Figure 4:
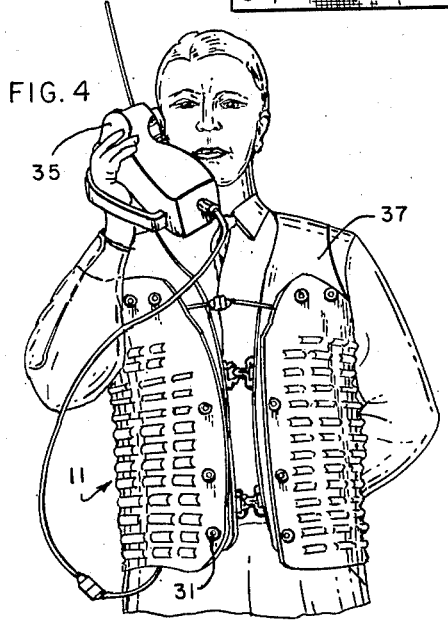
Figure 4 is a front elevational view showing the combined battery panel and vest on the wearer, wherein the battery is shown as an energy source for a portable radio receiver and transmitter.
Figure 3:
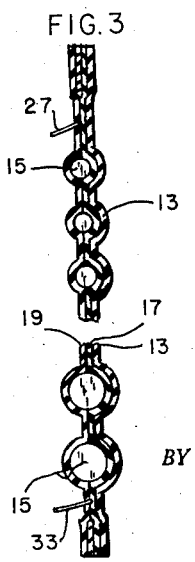
Figure 3 is a cross-sectional view of one battery panel taken on the line 3—3 of Figure 1.

In Figure 2 there is shown a vestlike garment 37 which serves as a harness for carrying the battery panel 11. The garment 37 is provided with snap-on fasteners 39 adapted to mate or engage snap-on fasteners 31 of the battery panel 11. By this means it is possible to readily and easily remove any one panel or panels from the garment even while encumbered with heavy gloves or the like, such as are worn in extremely cold climates. By such arrangement it is even possible to remove and replace a panel beneath the outer garment, such as a parka, as the panel fasteners will readily engage the fasteners on the garment.

Figure 5:
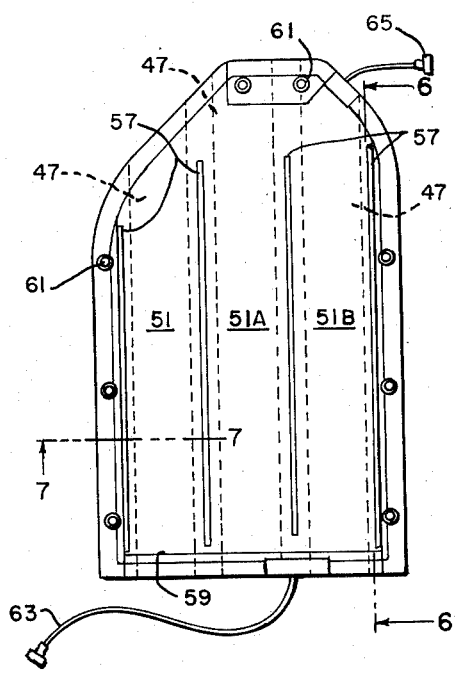
Figure 5 is a plan view of another embodiment of the invention.
Figure 6:
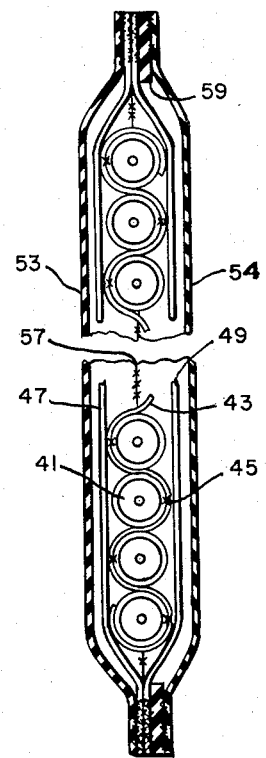
Figure 6 is a cross-sectional view of the battery of Figure 5 taken on the line 6—6 of Figure 5.
Figure 7:
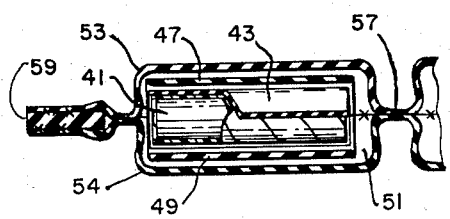
Figure 7 is a cross-sectional view of the battery of Figure 5 taken on the line 7—7 of Figure 5.

In Figure 6 there is shown another embodiment of the present invention wherein the panel battery 11 is assembled in the following manner: A plurality of primary cells 41 is placed in a line and a sheet of pliable plastic material 43, such as polyethylene, is sinuately wound about said dry cells thereby in effect spacing the cells from one another. At alternate points on adjacent cells the sinuately disposed plastic material 43 is either cemented or adequately secured to each cell 41 as shown at 45. Such row of cells is then placed between two sheets of pliable plastic material 47 and 49 whereby there is formed a strip or container of aligned and separated primary dry cells. In the embodiment of Figure 5 three such strips designated 51, 51A and 51B are shown, however, it is to be understood that any number of strips may be used in the fabrication of a particular panel battery. The adjoining strips 51, 51A and 51B are then placed between two layers of the pliable plastic material 53 and 55 and are sealed, such as by heat-treating, around the outer rim or edge of the panel and sealed between the adjacent strips, thereby forming ridges 57 between said strips. By the inclusion of the ridges 57 the panel can be flexed longitudinally and at the same time it can be flexed horizontally because of the relative movement between adjacent cells. In the fabrication of the panel heretofore described, the inner plastic strips 47, 49 are sealed at their upper and lower edges as shown in Figure 6. It is obvious that by the manner of assembling the panel herein described no undue movement of the cells 41 will take place. A layer 59 of plastic is applied to the rim for reinforcing said edge. The panel battery of the embodiment shown in Figure 5 is preferably made of the same material as the one shown in Figure 1, that is, a material that will be waterproof, yet at the same time permit the release of hazardous gases evolved from the cells. Such material is further characterized by permitting the entry of body heat into the battery to lengthen their usefulness when carried beneath an outer garment under extremely cold weather conditions. One form of wiring the dry cells is to connect said dry cells to one another within their respective strips 51, 51A, 51B, and such strips can then be linked to each other in any desired fashion. The battery panel of this embodiment is furnished with snap fasteners 61 such as were applied to the embodiment of Figure 1 for securing said panel to a vestlike garment in the same manner as heretofore described. Appropriate electrical connectors 63 and 65 form part of the battery panel, serving the same function as the connectors of the device of Figure 1.

While there have been herein set forth two embodiments of the invention, it is obvious that other modifications can be made without departing from the spirit and scope of the invention. For instance, the method of securing the cells to the flexible sheet 13 can be accomplished in any desired manner, viz., such battery cells can be cemented, tied, or clipped onto the flexible panel in lieu of the heat seal described in connection with the assembly of the panel in Figure 1. Furthermore, the separate strips of cells can be secured to the sheet 13 in any desired manner. The flexible battery panel can also be used without applying it to a garment, and in such cases need not be provided with the snap-on fasteners 25. Applications where such flexible batteries might be utilized would be in devices in which a battery was to assume a particular contour or shape where conventional box batteries could not be used.

What is claimed is:

In combination, a harness-like support and a readily deformable battery adaptable to assume the contour of said support and be carried thereon, said battery comprising a plurality of primary cells electrically connected to and spaced from each other, a sheet of pliable material sinuately disposed between adjacent aligned cells, a sheath of flexible material in which said cells are contained, sheets of flexible, waterproof material on opposite sides of said sheath to form a flexible pocket in which said sheath is contained, said material being of sufficient porosity to permit the escape of gases evolved from said cells, said battery being substantially coextensive with said harness, and an electrical output extending from said battery.

References Cited in the file of this patent

UNITED STATES PATENTS

| | | |
|---|---|---|
| 452,250 | Williams | May 12, 1891 |
| 539,484 | Newton | May 21, 1895 |
| 725,903 | Wilcomb | Apr. 21, 1903 |
| 867,721 | Hartzenbuehler | Oct. 8, 1907 |
| 2,089,402 | Murray | Aug. 10, 1937 |
| 2,519,527 | Wilkinson | Aug. 22, 1950 |
| 2,667,527 | Pucher | Jan. 26, 1954 |
| 2,676,738 | Herrick | Apr. 27, 1954 |

FOREIGN PATENTS

| | | |
|---|---|---|
| 495,667 | Canada | Sept. 1, 1953 |